(12) United States Patent
Smith

(10) Patent No.: US 6,581,544 B1
(45) Date of Patent: Jun. 24, 2003

(54) AIR CONDITIONED TRAILER FOR TRANSPORTING LIVING FOWL

(75) Inventor: Rocky L. Smith, Fairview, NC (US)

(73) Assignee: Smithway, Inc., Fairview, NC (US)

( * ) Notice: Subject to any disclaimer, the term of this patent is extended or adjusted under 35 U.S.C. 154(b) by 0 days.

(21) Appl. No.: 10/037,421

(22) Filed: Oct. 24, 2001

(51) Int. Cl.[7] .................................................. B60P 3/04
(52) U.S. Cl. ......................... 119/401; 62/239; 62/411; 62/412; 454/91
(58) Field of Search ................................ 119/401, 402; 454/90, 91, 92; 62/239, 410, 411, 412; 165/41, 42, 43

(56) References Cited

U.S. PATENT DOCUMENTS

| | | | |
|---|---|---|---|
| 2,260,999 A | | 10/1941 | Mann |
| 2,305,075 A | | 12/1942 | Gilpin |
| 2,610,567 A | * | 9/1952 | Davis ........................ 454/118 |
| 3,792,595 A | | 2/1974 | Willis |
| 4,300,441 A | | 11/1981 | Dicks |
| 4,454,837 A | * | 6/1984 | Luebke ...................... 119/401 |
| 4,481,870 A | * | 11/1984 | Smith ........................ 454/88 |
| 4,726,196 A | | 2/1988 | Zajic |
| 5,215,498 A | * | 6/1993 | Wong et al. ................. 454/208 |
| 5,765,505 A | * | 6/1998 | Yun ........................... 119/432 |
| 5,830,057 A | | 11/1998 | Hunt, Jr. |

* cited by examiner

Primary Examiner—Harold Joyce
(74) Attorney, Agent, or Firm—Carter Schnedler & Monteith, P.A.

(57) ABSTRACT

There is provided an enclosed air conditioned trailer for transporting living fowl. The trailer includes a ceiling, first and second side walls, a front wall, a rear opening having a door attached thereto, and a bottom platform. A floor is located above the bottom platform, forming a space therebetween. At least one elongated air handling duct is located in the space. One end of the duct is attached to an air conditioning apparatus located near the front wall. The other end of the duct is located near the rear opening of the trailer. The floor forms the top of the duct. A plurality of openings are provided along the top of the duct so that air can pass from the duct into the inside of the trailer above the floor. The duct is tapered so that the velocity air flow from the holes is substantially equalized for the length of the duct. An outside air intake valve is provided and is opened in response to the detection of high $CO_2$ levels on the inside of the trailer.

9 Claims, 4 Drawing Sheets

AIR CONDITIONED TRAILER FOR TRANSPORTING LIVING FOWL

BACKGROUND OF THE INVENTION

This invention relates to an enclosed trailer. More particularly, it relates to an improved trailer for transporting live fowl.

One of the problems in transporting large numbers of living fowl, such as baby chicks, is the need to remove excess heat from their immediate environment to insure that a large number of the fowl will survive the transport. Transporting fowl in an open air trailer, while permitting a great deal of air circulation for cooling the fowl during transport, is not acceptable because of the direct exposure of the fowl to the elements.

Therefore, fowl are normally transported in closed trailers. Often over 90,000 chicks are placed in a typical trailer. Each chick gives off approximately 1 BTU of heat per hour. In addition, the chicks give off a substantial amount of carbon dioxide in the breathing process. High levels of carbon dioxide in an enclosed trailer can suffocate the chicks. Thus it is imperative to remove carbon dioxide, as well as excess heat from the trailer.

Trailers have been designed with in-wall and overhead duct work, and with fans for circulating the air. The air ducts may be connected to various sources of forced air, such as air conditioners, fans and, in some cases, forced air heaters for winter transport. The air is often circulated over open grates in a false bottom floor of a trailer between rows of fowl. Even with more sophisticated environmental control systems, hot spots have developed where air circulation is poor. It has been found that many of the fowl in areas having hot spots will not survive a long transport.

A major innovation in the transport of living fowl is described in U.S. Pat. No. 4,481,870, issued to G. D. Smith. The Smith patent shows a closed duct ventilation system located in the floor of the trailer, and provides forced air between parallel rolls of chicks. While the Smith patent incidentally discloses that an air conditioner system could be utilized, there is no detailed description of an air conditioning system. In addition, the Smith patent does not discuss the carbon dioxide problem associated with the transport of chicks.

OBJECTS OF THE INVENTION

It is, therefore, one object of this invention to provide an improved enclosed air conditioned trailer for transporting living fowl.

It is another object of this invention to provide an improved enclosed air conditioned trailer for transporting living fowl which provides uniform cooling throughout the trailer.

It is a further object of this invention to provide an enclosed air conditioned trailer for transporting living fowl which removes excess carbon dioxide from the trailer.

SUMMARY OF THE INVENTION

In accordance with one form of this invention, there is provided an enclosed air conditioned trailer adapted to transport living fowl. An enclosure is provided and is defined by a ceiling, first and second side walls, a front wall, a rear opening, and a bottom platform. At least one door is associated with the rear opening. A floor is located above the bottom platform. The floor and bottom platform form a space. At least one elongated air handling duct is located in the space. The air handling duct has first and second ends. An air conditioning apparatus is located near the first wall and is connected to the first end of the air handling duct. The second end of the air handling duct is located near the rear opening. A mechanism is provided for permitting air to escape from the duct along the length of the duct. The first end of the duct is wider than the second end of the duct so that the duct is tapered along its length whereby air escaping the duct moves at substantially uniform velocities along the entire length of the duct.

In accordance with another form of this invention, there is provided an enclosed air conditioned trailer adapted to transport living fowl which produce carbon dioxide. An enclosure is provided and is defined by a ceiling, first and second side walls, a front wall, a rear opening and a bottom platform. At least one door is associated with the rear opening. An air conditioning apparatus is provided for supplying temperature controlled air to the enclosure. At least one outside air intake valve is provided. An actuator is provided for opening and closing the valve. At least one carbon dioxide detector is located within the enclosure. The actuator is responsive to the carbon dioxide detector. When the carbon dioxide within the enclosure is sufficiently high, the valve is opened by the actuator, thereby increasing the oxygen level within the enclosure. In the preferred embodiment, at least one and preferably two air outlet valves are also provided for removing excess carbon dioxide from the enclosure.

BRIEF DESCRIPTION OF THE DRAWINGS

The subject matter which is regarded as the invention is set forth in the appended claims. The invention itself, however, together with further objects and advantages thereof may be better understood in reference to the, following descriptions taken in conjunction with the accompanying drawings in which:

DESCRIPTION OF THE PREFERRED EMBODIMENT

Figure 1:
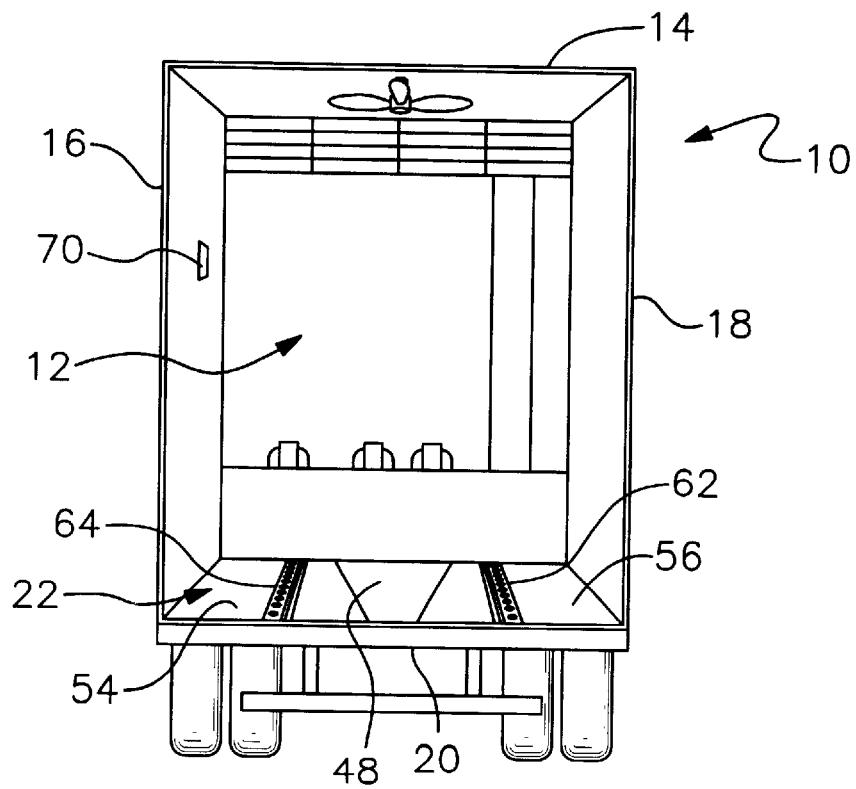
FIG. 1 is a rear elevational view of the improved air conditioned trailer with the rear doors and the center floor panel removed.
Figure 3:
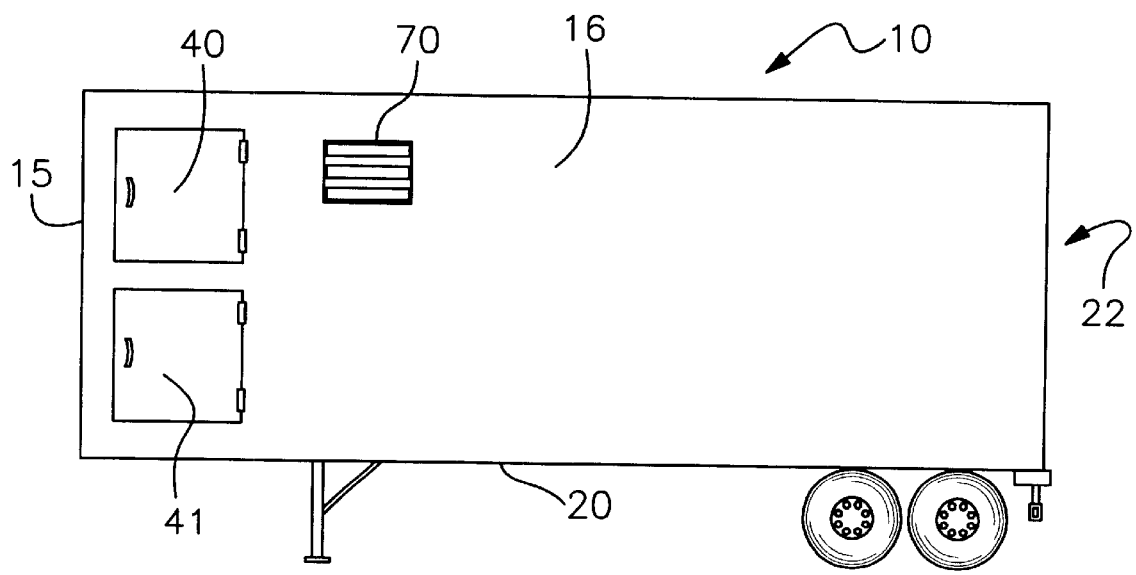
FIG. 3 is a side elevational view of the trailer of FIG. 1.

Referring now more particularly to FIGS. 1 and 3, there is provided enclosed trailer 10 housing. Trailer 10 includes enclosure 12 which is formed by ceiling 14, first side wall 16, second side wall 18, front wall 15, bottom 20, and rear opening 22.

Figure 2:
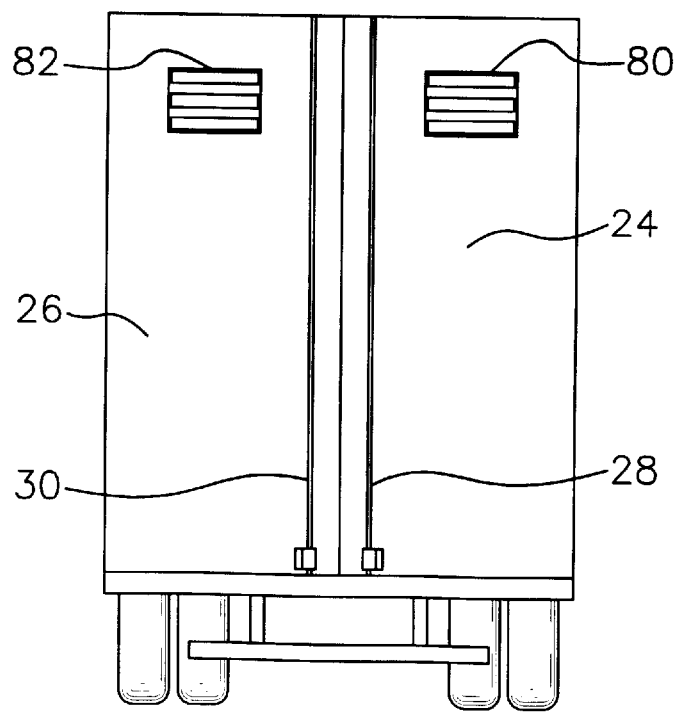
FIG. 2 is a rear elevational view of the trailer of FIG. 1, however, with the rear doors the trailer in a closed position.

Referring now to FIG. 2, doors 24 and 26 cover the rear opening 22. Doors 24 and 26 are opened, closed and secured by latching mechanisms 28 and 30.

Figure 7:
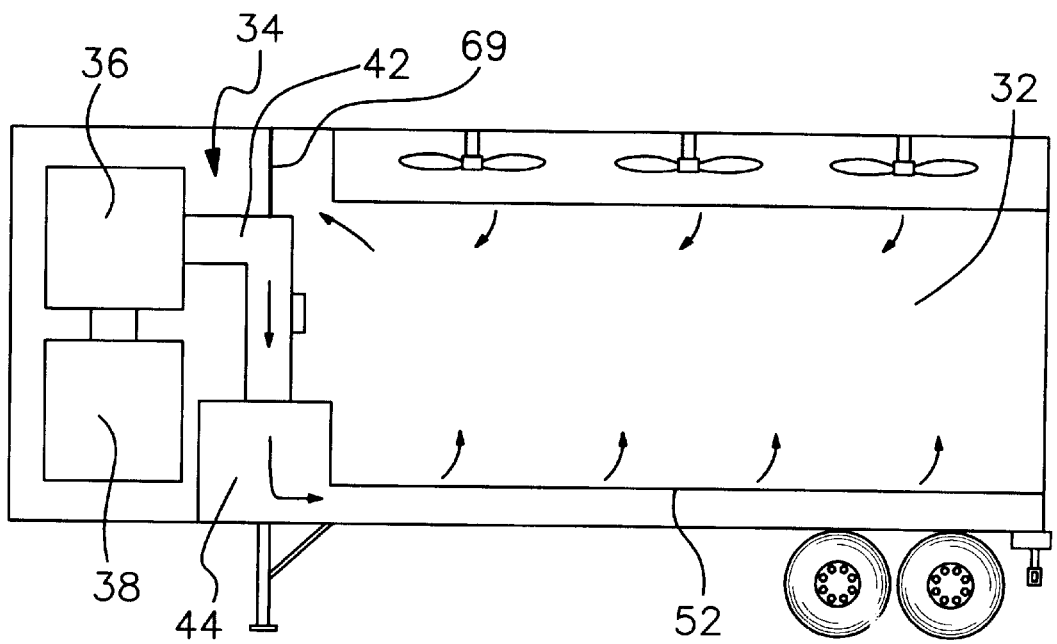
FIG. 7 is a side elevational view of FIG. 3, however, with the first side wall removed.

Referring now to FIGS. 3 and 7, enclosure 12 is divided into two compartments, namely, the transport compartment 32 and the mechanical compartment 34. The mechanical compartment 34 houses air conditioning unit 36 which, preferably, is a 10 ton air conditioning unit. Mechanical compartment 34 also houses electrical generator 38 which, preferably, is a 35 kilowatt generator. The air conditioning unit 36 is accessed by door 40 on the first side 16 of the trailer. The electrical generator 38 is accessed by door 41 which is also on the first side 16 of the trailer. Tube 42 is connected to the air conditioning unit 36. Tube 42 is further connected to plenum 44.

Figure 4:
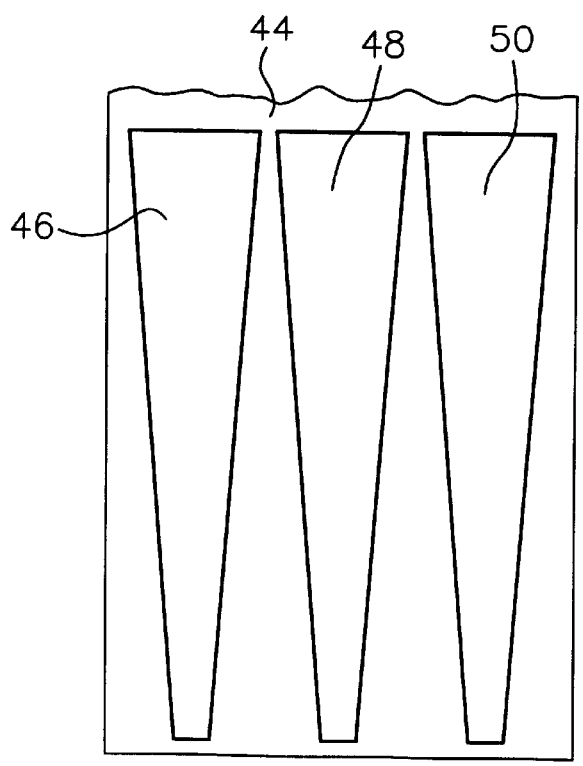
FIG. 4 is a partial top plan view of the inside bottom of the trailer of FIG. 1, however, with all of the floor panels and support base removed showing the air ducts.
Figure 8:
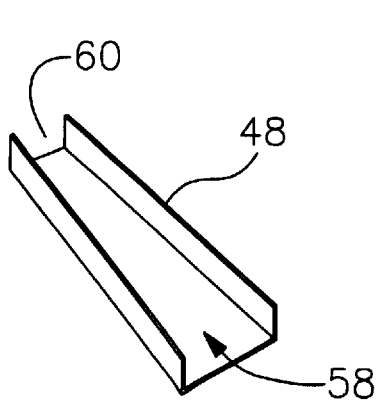
FIG. 8 is a perspective view of one of the air ducts of FIG. 4.
Figure 9:
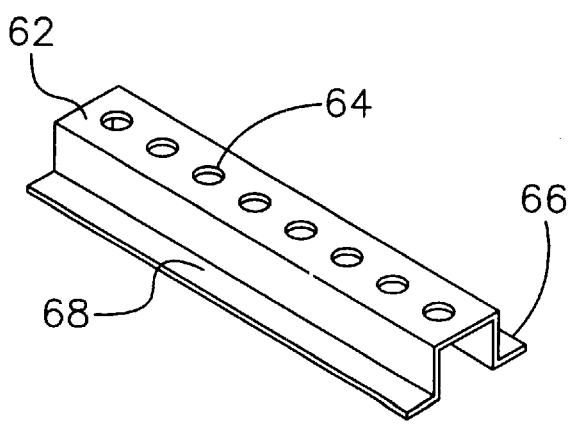
FIG. 9 is a perspective view of one of the elongated support bars shown in FIG. 1.

Referring now more particularly to FIGS. 1 and 4, a plurality of air handling ducts 46, 48 and 50, preferably three or four in number, rest against the bottom 20 of the trailer and within the space formed by the bottom 20 and the trailer floor 52. The trailer floor 52 is formed primarily by three removable panels, two of which, namely, panels 54 and 56 are shown in FIG. 1. As can be seen in FIGS. 1, 4 and 8, the air ducts are tapered. The first end 58 of each air duct is wider than its second end 60. The length of each air duct depends on the length of the transport compartment 32 of the trailer. The duct length often will vary between 10 feet and 48 feet. Preferably, each duct is 22 inches wide at the first end 58 and is 6 inches wide at the second end 60. As seen in FIG. 1, an elongated support bar 62 having a plurality of spaced apart holes 64 therethrough is received over each air duct. The support bar and the adjacent panels form the top of each air duct. Thus each air duct itself is open at the top when support bar 62 and panels are removed, which enables one to easily clean out the air duct. The tapering of the air duct provides for substantial equalization of the velocity air flow upwardly through all of the holes 64 for the entire length of the transport compartment 32 of trailer enclosure 12. This equalization of air flow is important so that there are no hot spots in the trailer. Each chick will receive substantially the same amount of conditioned air to ensure that most all of the chicks will survive the transport. That is, by tapering the air ducts, the velocity of the air will tend to increase as it moves from the wide end 58 to the narrow end 60 while at the same time, air is being removed from the holes 64. Each of the support bars 62 includes a pair of flanges 66 and 68 projecting therefrom. The flanges 66 and 68 provide support for the edges of the floor panels 54 and 56 and the other floor panels, which are not shown. The floor panels may be readily removed so that the air ducts 46, 48 and 50, as well as the bottom platform 20 may be easily cleaned. Return air filter 69 is provided to trap feathers so air conditioning unit 36 will not become clogged with feathers.

The air conditioned trailer described above has been tested. When the outside temperature was 110° F., the inside temperature stayed at 78° F. while transporting 94,000 baby chicks.

Figure 5:
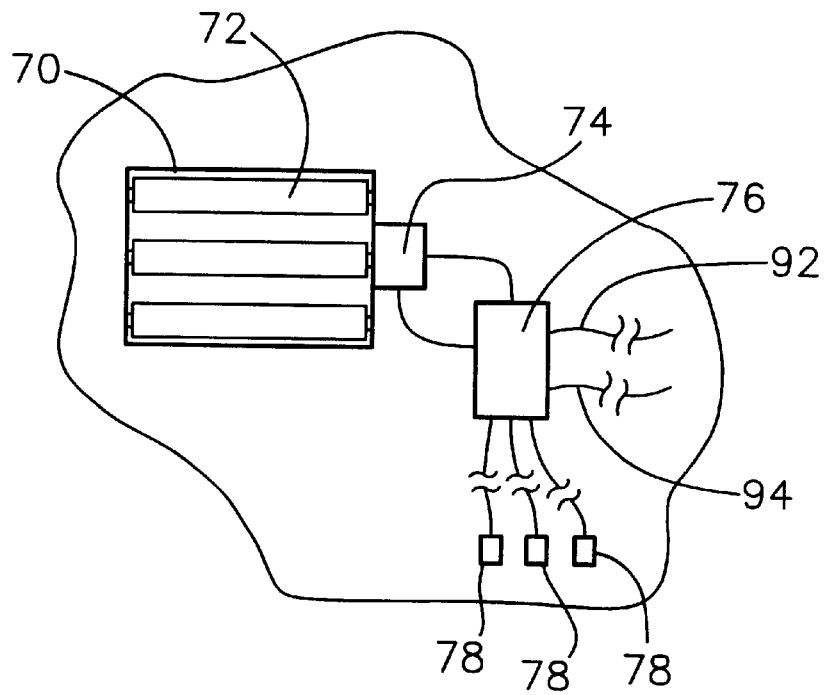
FIG. 5 is a side elevational view of a part of the inside first side wall of the trailer of FIG. 1.

As stated above, another problem in addition to heat when transporting baby chicks is excess carbon dioxide production. Referring now more particularly to FIG. 3, a louvered opening 70 is provided in the first wall 16. The louvered opening forms a valve for admitting outside air into the inside of the trailer enclosure 12. The valve 70 includes a plurality of moveable louvers 72. As shown in FIG. 5, the louvers are moved by actuator 74, which is located adjacent to the opening 70 on the inside of the trailer. Control 76 controls actuator 74. A plurality of carbon dioxide detectors 78 are located at various positions inside of the trailer. When high carbon dioxide is detected, actuator 74 causes louvers 72 to open, thereby admitting outside air into the inside of the trailer, which will raise the oxygen level.

Figure 6:
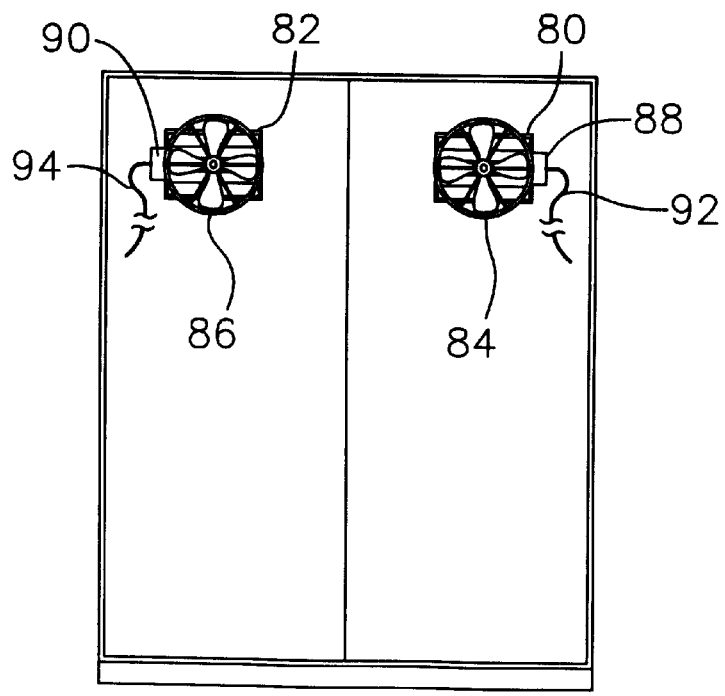
FIG. 6 is a elevational view of the inside of the rear doors of the trailer of FIG. 2.

As shown in FIG. 2, the rear doors 24 and 26 of the trailer include louvered openings 80 and 82. As shown in FIG. 6, which is from the inside of the trailer, a fan 84 is located adjacent to louvered opening 80 and a fan 86 is located adjacent to adjacent to louvered opening 82. Actuator 88 controls the louvers associated with opening 80 and fan 84, and actuator 90 controls the louvers associated with opening 82 and fan 86. Actuators 88 and 90 are connected to control unit 76 through wires 92 and 94. When the carbon dioxide detector 78 calls for the louvers 72 on opening 70 to come open, control unit 76 will signal the louvers associated with openings 80 and 82 to also open and, in addition, will signal the fans 84 and 86 to come on. This will create an air flow through the trailer of fresh outside air from opening 70 through openings 80 and 82. Thus the carbon dioxide level will quickly be reduced and the oxygen level will increase. Once the carbon dioxide level has fallen below a predetermined level, the actuator 74 will close louvers 72 and, in addition, will cause the louvers associated with openings 80 and 82 to close, and the fans 84 and 86 to turn off.

In one embodiment of the invention described above, the system returns all but 1600 CFM's of the air back to the air conditioner or heat system, whichever may be in operation, depending on the weather conditions. The 1600 CFM's of air that is not returned is exhausted via the two air openings 80 and 82. The returned air passes through air filter 69 into a mixing chamber or plenum 44. Upon entering the mixing chamber, the returned air is mixed with fresh air that has been conditioned, either by the air conditioner or forced air heater. After mixing takes place, this air is returned to the transport compartment 32 through the air handling ducts 46, 48 and 50.

From the foregoing description of the preferred embodiment of the invention, it will be apparent that many modifications may be made therein. It should be understood, however, that this embodiment of the invention is an exemplification of the invention only and that the invention is not limited thereto. It is to be understood, therefore, that it is intended in the appended claims to cover all modifications as fall within the true spirit and scope of the invention.

What is claimed is:

1. An enclosed air conditioned trailer for transporting living fowl comprising:

first and second adjacent enclosures;

said first enclosure defined by a ceiling, first and second side walls, a front wall, a rear opening, and a bottom platform;

said front wall defining a boundary between said first and second enclosures;

at least one door associated with said rear opening;

a floor located above said bottom platform; said floor and said bottom platform forming a space;

at least first and second elongated air handling ducts located in said space; each said air handling ducts having first and second ends;

said first and second elongated ducts being adjacent to one another;

air conditioning apparatus located in said second enclosure near said front wall; said first end of each of said air handling ducts connected to said air conditioning apparatus; said second end of each of said air handling ducts located near said rear opening;

a mechanism for permitting air to escape upwardly from each of said ducts along the length of each of said ducts; said first end of each of said ducts being wider than said second end of each of said ducts so that each of said ducts is tapered along its length whereby air escaping upwardly from each of said ducts moves at substantially uniform velocities along the entire length and width of said floor thereby substantially eliminating places in said first enclosure where the temperature is not substantially uniform.

2. An enclosed trailer as set forth in claim 1, wherein at least one fan is attached to said ceiling.

3. An enclosed trailer as set forth in claim 1, wherein each of said elongated support bars have a pair of flanges extending from opposite sides thereof; said flanges supporting said panels; a portion of each of said support bars extending upwardly from said floor whereby rows of living fowl containers may be placed adjacent thereto so that the containers will remain in rows while the trailer is in motion.

4. An enclosed trailer as set forth in claim 1, further including a return air mechanism; at least one filter associated with said return air means for capturing feathers.

5. An enclosed trailer as set forth in claim 1, further including three of said elongated air handling ducts adjacent to one another, three of said elongated support bars and four of said floor panels.

6. An enclosed trailer as set forth in claim 1, wherein said floor is removable; whereby said ducts are made readily accessible and easy to clean.

7. An enclosed trailer as set forth in claim 1, further including an outside air intake valve; said air intake valve being opened upon the detection of high levels of carbon dioxide inside said enclosure.

8. An enclosed trailer as set forth in claim 7, further including at least one air outlet valve; said air outlet valve being opened in response to said air intake valve being opened.

9. An enclosed air conditioned trailer for transporting living fowl comprising: first and second adjacent enclosures; said first enclosure defined by a ceiling, first and second side walls, a front wall, a rear opening, and a bottom platform; said front wall defining a boundary between said first and second enclosures; at least one door associated with said rear opening; a floor located above said bottom platform; said floor and said bottom platform forming a space; at least first and second elongated air handling ducts located in said space; each said air handling ducts having first and second ends; said first and second elongated ducts being adjacent to one another; air conditioning apparatus located in said second enclosure near said front wall; said first end of each of said air handling ducts connected to said air conditioning apparatus; said second end of each of said air handling ducts located near said rear opening; a mechanism for permitting air to escape upwardly from each of said ducts along the length of each of said ducts; said first end of each of said ducts being wider than said second end of each of said ducts so that each of said ducts is tapered along its length whereby air escaping upwardly from each of said ducts moves at substantially uniform velocities along the entire length and width of said floor thereby substantially eliminating places in said first enclosure where the temperature is not substantially uniform; at least one fan is attached to said ceiling; said floor includes at least two panels; an elongated support bar located over the top of each of said ducts; each of said support bars having a plurality of holes therein for permitting air to escape from said ducts to the inside of said first enclosure; each of said elongated support bars have a pair of flanges extending from opposite sides thereof; said flanges supporting said panels; a portion of each of said support bars extending upwardly from said floor whereby rows of living fowl containers may be placed adjacent thereto so that the containers will remain in rows while the trailer is in motion; a return air mechanism; at least one filter associated with said return air mechanism for capturing feathers; a third elongated air handling duct adjacent to said first and second ducts, said floor is removable whereby said ducts are made readily accessible and easy to clean; an outside air intake valve; said air intake valve being opened upon the detection of high levels of carbon dioxide inside said enclosure; at least one air outlet valve; said air outlet valve being opened in response to said air intake valve being opened.

* * * * *